| (12) | United States Patent | (10) Patent No.: | US 8,740,125 B2 |
|---|---|---|---|
| | Ogawa et al. | (45) Date of Patent: | Jun. 3, 2014 |

(54) SEATBELT RETRACTOR

(75) Inventors: Kiyoshi Ogawa, Yokohama (JP); Katsuyasu Ono, Yokohama (JP); Yuichi Hamano, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 100 days.

(21) Appl. No.: 13/264,870

(22) PCT Filed: Mar. 31, 2010

(86) PCT No.: PCT/JP2010/055955
§ 371 (c)(1),
(2), (4) Date: Oct. 24, 2011

(87) PCT Pub. No.: WO2010/119778

PCT Pub. Date: Oct. 21, 2010

(65) Prior Publication Data

US 2012/0043407 A1    Feb. 23, 2012

(30) Foreign Application Priority Data

Apr. 17, 2009   (JP) .................................. 2009-101071

(51) Int. Cl.
*B65H 75/48* (2006.01)

(52) U.S. Cl.
USPC .................................................... 242/379.1

(58) Field of Classification Search
USPC ........ 242/379.1; 280/805, 806, 807; 297/474, 297/475, 476, 479
See application file for complete search history.

(56) References Cited

U.S. PATENT DOCUMENTS 6,616,081 B1 *   9/2003   Clute et al. ................. 242/379.1

FOREIGN PATENT DOCUMENTS

| JP | 2003-502204 | 1/2003 |
|---|---|---|
| JP | 2008-174049 | 7/2008 |
| JP | 2008-254459 | 10/2008 |

OTHER PUBLICATIONS

International Search Report of PCT/JP2010/055955 Mailed on May 11, 2010 (1 page).

* cited by examiner

*Primary Examiner* — Sang Kim
*Assistant Examiner* — Juan Campos, Jr.
(74) *Attorney, Agent, or Firm* — Brinks Gilson & Lione

(57) ABSTRACT

A seatbelt retractor having a switching device with a gas generator and a switch housing having a gas generator housing portion for accommodating the gas generator and a gas flow path that communicates with the gas generator housing portion so that gas generated by the gas generator passes through the gas flow path. Further, the gas generator housing portion and the gas flow path are formed in the switch housing in a curved shape, and a die-cut hole extending in a direction of the gas flow path on an opposite side of the gas flow path to the gas generator housing portion is blocked from the gas flow path by the gas generator.

14 Claims, 10 Drawing Sheets

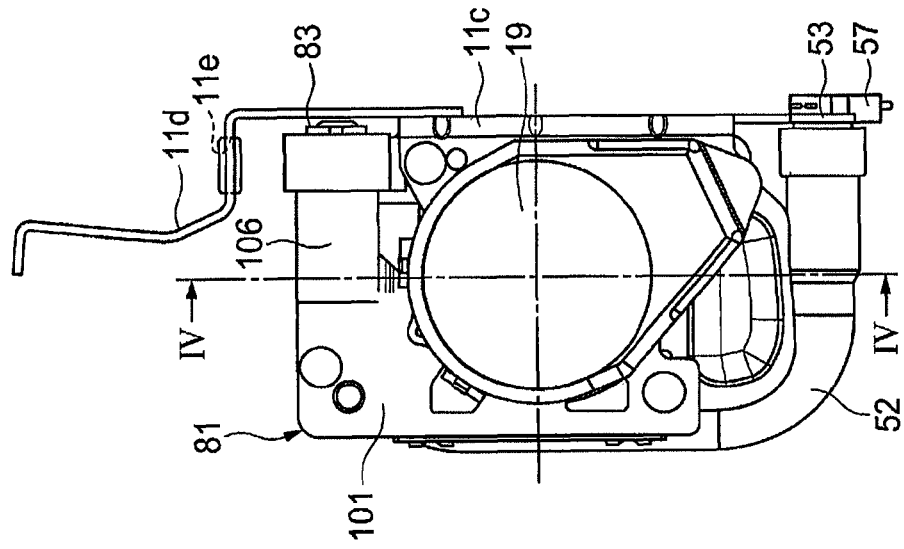
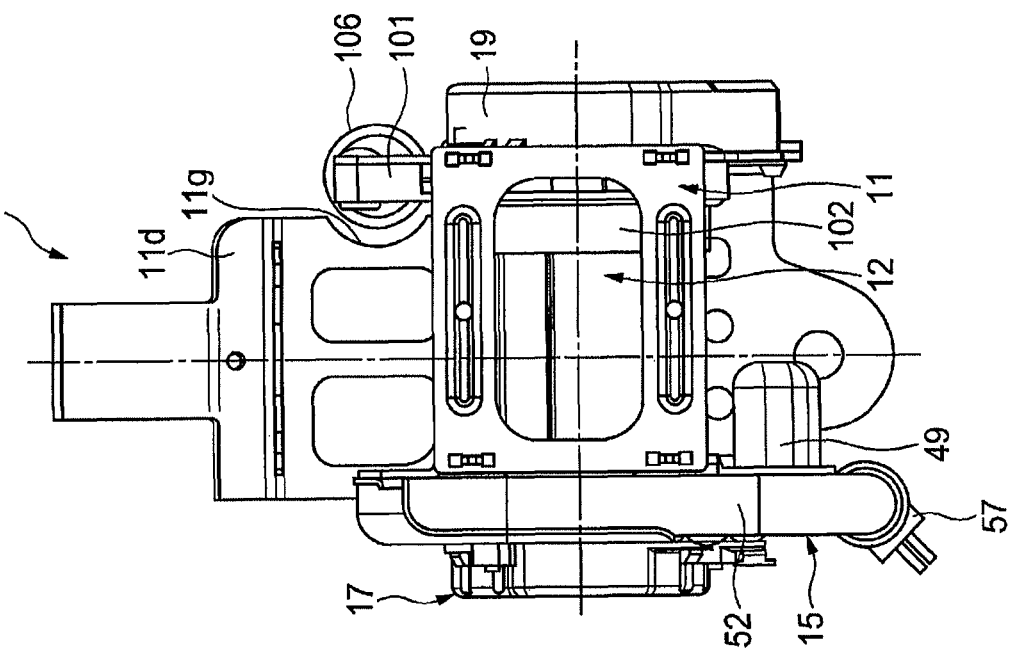

SEATBELT RETRACTOR

BACKGROUND

1. Field of the Invention

The present invention relates to a seatbelt retractor, and more particularly to a seatbelt retractor having a force limiter mechanism.

2. Related Technology

Recent seatbelt retractors are provided with a force limiter mechanism that reduces a load on a chest portion of an occupant by unreeling a belt while absorbing energy when a load of a set value or more is exerted on the belt (see Japanese Translation of PCT Application No. 2003-502204, for example). In the seatbelt retractor described in that document, a torsion bar is constituted by a plurality of shaft parts having different twisting torques, and by switching the plurality of shaft parts of the torsion bar using a switching device, an energy absorption load of the force limiter mechanism can be modified.

Incidentally, the switching device described in the PCT application mentioned above switches a force transmission position of the plurality of shaft parts by activating a switching member via a switch housing gas generated by a gas generator. Conventionally, to ensure that a housing portion of a switch housing for accommodating this type of gas generator does not interfere with a system cover accommodating an emergency lock mechanism or a webbing and to eliminate the need to open a hole in a frame in order to connect a connector for the gas generator, the housing portion is formed so as to bulge diagonally downward or diagonally upward along a gas flow path through which the gas flows. The gas flow path and the housing portion are formed in the switch housing by inserting sliding pieces, performing die-casting, and withdrawing the sliding pieces such that the gas flow path and the housing portion are formed rectilinearly in the parts from which the sliding pieces were withdrawn.

When the gas generator is disposed in a diagonally upward orientation, however, water and the like may infiltrate the gas generator. Further, the connector for the gas generator is preferably connected after the retractor is attached to a vehicle to prevent the connector from being pulled such that excessive force is exerted thereon during assembly, When the gas generator is to be disposed in a diagonally downward orientation, this attachment operation is difficult. Therefore, to improve ease of assembly, the housing portion is preferably formed so as to curve in a different direction to the diagonally formed gas flow path.

For example, when die-casting is performed using two sliding pieces for forming the gas flow path and the housing portion in the switch housing, one must close a die-cut hole through which the sliding piece for forming the gas flow path is withdrawn. A lid may be provided to close the die-cut hole, but this leads to an increase in the number of components and requires an attachment operation. When the switch housing is formed using lost wax casting, sand mold casting, or the like, a die-cut hole need not be provided during manufacture. However, these methods are not suitable for mass production.

SUMMARY OF THE INVENTION

The present invention has been designed in consideration of the circumstances described above, and an object thereof is to provide a seatbelt retractor in which a gas generator for a switching device can be laid out in an optimum position and a hole formed in a switch housing which, when a gas flow path and a gas generator housing portion are formed in a curved shape, can be closed efficiently.

In overcoming the drawbacks and limitations and in achieving the objects mentioned above, the present invention provides for a seatbelt retractor including:

a retractor frame;

a spindle supported by the retractor frame and being free to rotate, a webbing being wound around the spindle;

a lock member that is supported by the retractor frame and being free to rotate in a normal state and fixed to the retractor frame during an emergency;

a torsion bar disposed on a force transmission path between the spindle and the lock member, the torsion bar including a plurality of shaft parts having different twisting torques; and a switching device for switching the plurality of shaft parts of the torsion bar forming the force transmission path, wherein the switching device includes a path switching gas generator, a switch housing and a gas flow path, the switch housing having a gas generator housing portion for accommodating the gas generator, the gas flow path being in communication with the gas generator housing portion so that gas generated by the gas generator passes through, the gas generator housing portion and the gas flow path being formed in the switch housing in a curved shape, and a hole extending in a direction of the gas flow path, the hole being located on an opposite side of the gas flow path from the gas generator housing portion and the hole being blocked from the gas flow path by the gas generator.

In a further aspect of the invention, the gas generator housing portion extends horizontally when the retractor is attached to a vehicle.

In another aspect of the invention, the switch housing is attached to an inner side of a side plate of the retractor frame.

In still another aspect of the invention, when the retractor is attached to the vehicle, the gas generator housing portion is disposed in an upper portion of the switch housing in a position that prevents interference with a webbing that is guided by a webbing guide hole of the retractor frame, and a cutout is formed in the retractor frame in a position opposing an opening portion in the gas generator housing portion.

In yet a further aspect of the invention, the hole extending in the direction of the gas flow path on the opposite side of the gas flow path to the gas generator housing portion is a die-cut hole formed by die cutting.

In the seatbelt retractor embodying the principles to the present invention, the switching device includes the path switching gas generator and the switch housing having the gas generator housing portion for accommodating the gas generator and the gas flow path that communicates with the gas generator housing portion so that the gas generated by the gas generator passes through. The gas generator housing portion and the gas flow path are formed in the switch housing in a curved shape, and the hole extending in the direction of the gas flow path on the opposite side of the gas flow path to the gas generator housing portion is blocked from the gas flow path by the gas generator. Thus, the gas generator for the switching device can be laid out in an optimum position, and the hole formed in the switch housing when the gas flow path and the gas generator housing portion are formed in a curved shape can be closed efficiently during ignition of the gas generator without providing a separate lid or the like.

BRIEF DESCRIPTION OF THE DRAWINGS

FIG. 3(a) is a front view of the seatbelt retractor, and FIG. 3(b) is a side view showing a system cover side thereof;

DETAILED DESCRIPTION

A seatbelt retractor according to an embodiment of the present invention will be described in detail below with reference to FIGS. 1 to 10.

Figure 1:
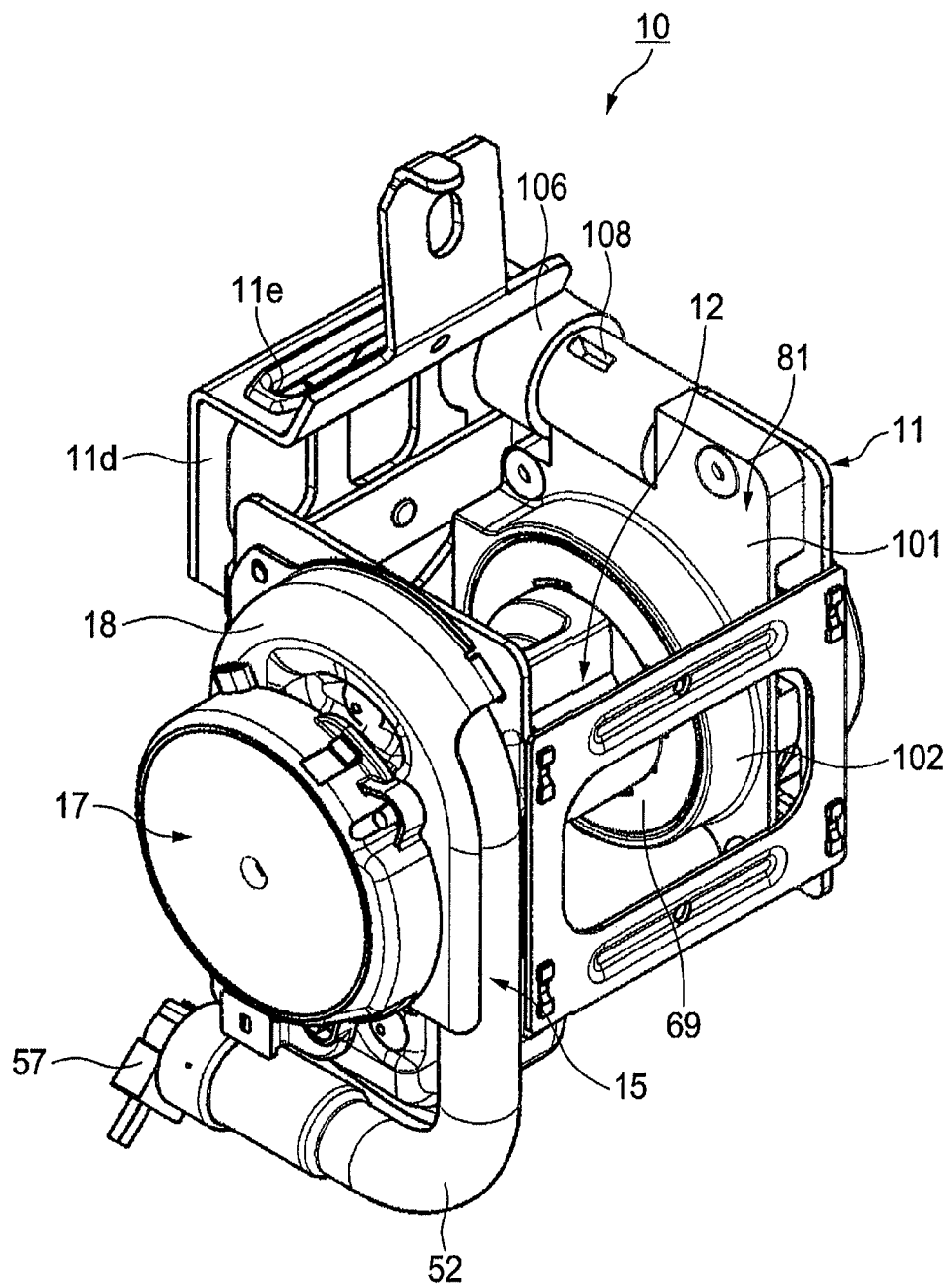
FIG. 1 is a perspective view showing a seatbelt retractor according to a first embodiment of the present invention.
Figure 2:
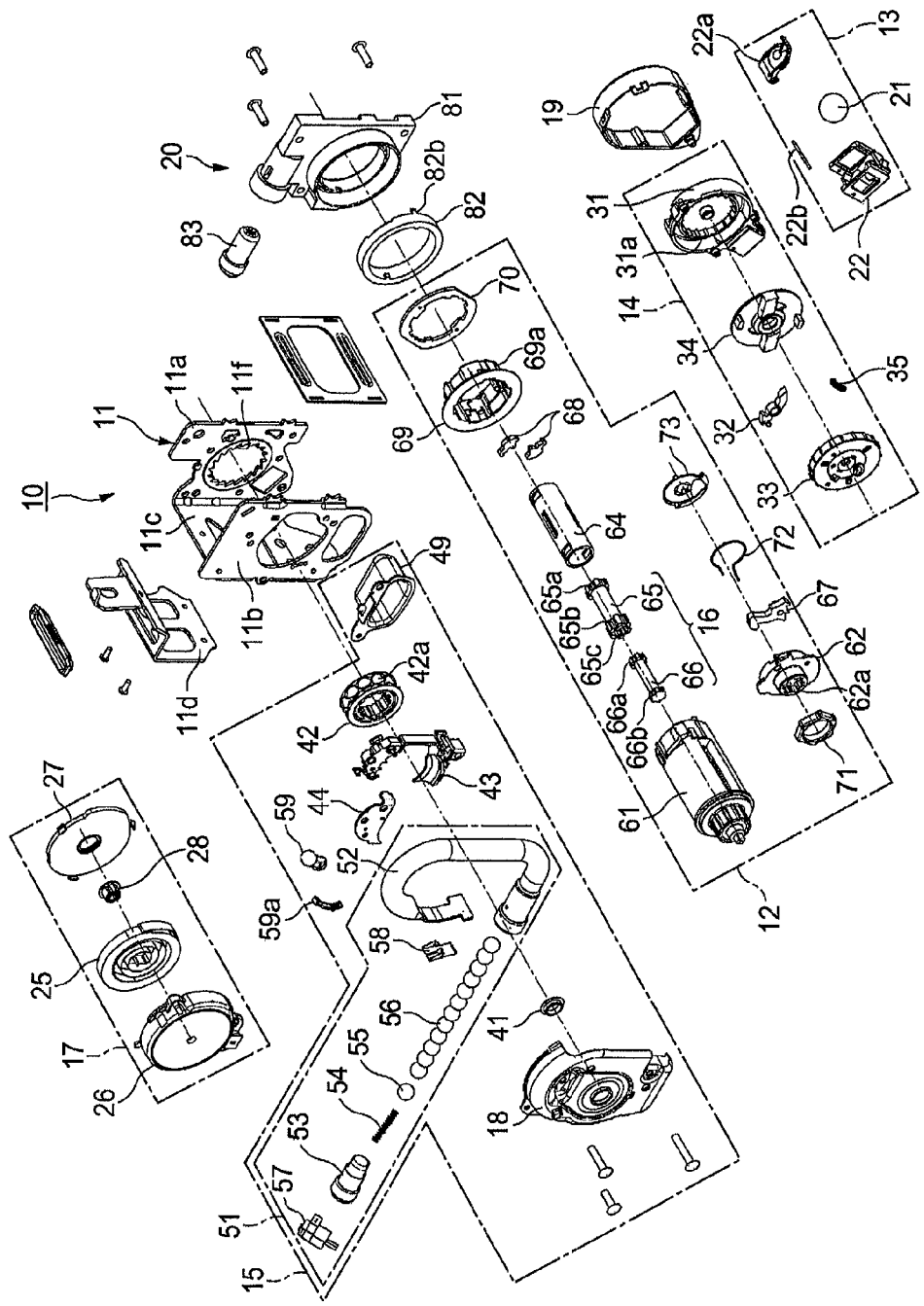
FIG. 2 is an exploded perspective view of the seatbelt retractor shown in FIG. 1.

As shown in FIGS. 1 to 3, a seatbelt retractor 10 according to the principles of the present invention includes a spindle assembly 12 supported rotatably on a retractor frame 11 in order to retract a seatbelt (not shown), a retraction spring device 17 that biases the spindle assembly 12 in a seatbelt retraction direction, an acceleration sensor 13 that detects horizontal direction acceleration in a vehicle, a lock mechanism 14 that locks an unreeling operation of the seatbelt in accordance with the acceleration detected by the acceleration sensor 13, a pretensioner 15 that acts on the spindle assembly 12 during a vehicle collision to retract the seatbelt, and a force limiter mechanism 16 that unreels the seatbelt while absorbing energy when a load of at least a set value acts on the seatbelt.

The retraction spring device 17 and the pretensioner 15 are disposed on one end side of the spindle assembly 12 in an axial direction and attached to the retractor frame 11. The acceleration sensor 13 and the lock mechanism 14, meanwhile, are disposed on another end side of the spindle assembly 12 in the axial direction and housed in a system cover 19 attached to the retractor frame 11.

The retraction spring device 17 includes a retraction spring 25, retraction spring covers 26, 27 accommodating the retraction spring 25, and a retraction spring joint portion 28 attached to a tip end of the spindle 12 in order to support an inner peripheral end portion of the retraction spring 25.

The acceleration sensor 13 includes a spherical sensor weight 21 and a sensor case 22 accommodating the sensor weight 21. A sensor lever 22a is attached to the sensor case 22 so as to be rotatable about a shaft member 22b.

Various well-known constitutions may be employed in the lock mechanism 14. In this embodiment, the lock mechanism 14 includes a WS lever 32, a steering wheel 33, an inertial body 34, and a spring 35, which are disposed between a side plate 11a of the retractor frame 11 and a bearing plate 31 attached to the side plate 11a. The inertial body 34 is attached to the steering wheel 33 to be capable of rotating slightly relative thereto, while the WS lever 32 is biased by the spring 35 and attached rotatably to the steering wheel 33 in a biased state. When the inertial body 34 and the steering wheel 33 rotate relative to each other, the WS lever 32 rotates against a biasing force of the spring 35, thereby engaging with an inner tooth 31a of the bearing plate 31.

Further, when the horizontal direction acceleration exceeds a predetermined value during a vehicle collision or the like, the sensor weight 21 of the acceleration sensor 13 moves such that the sensor lever 22a rotates upward. As the sensor lever 22a continues to rotate upward, the sensor lever 22a engages with the steering wheel 33. When the seatbelt is unreeled from the retractor 10 in a state where the steering wheel 33 is prevented from rotating in an unreeling direction, a rotation delay is generated in the steering wheel 33 relative to the spindle 12. Accordingly, a lock piece 67 to be described below, which is attached rotatably to the steering wheel 33, moves outward in a radial direction so as to engage with lock teeth 11f formed on an inner side of the side plate 11a of the retractor frame 11, and as a result, a seatbelt unreeling operation performed by the spindle 12 is locked.

The pretensioner 15 includes a bearing bush 41, a pretension ring 42, ball guides 43, 44, and a ball trap 49, which are disposed between a side plate 11b of the retractor frame 11 and a tube cover 18 attached to the side plate 11b, and a driving device 51 disposed on a periphery of the pretension ring 42.

The driving device 51 includes a pipe housing 52 attached to the retractor frame 11, a gas generator 53 provided in the pipe housing 52, a spring 54, a piston 55, and balls 56 serving as mass bodies. A connector 57 is attached to the gas generator 53, and when the gas generator 53 is ignited, leading to an increase in gas pressure, the balls 56 are pushed out via the piston 55 so as to enter a groove portion 42a in the pretension ring 42, thereby causing the pretension ring 42 to rotate. Note that the spring 54 prevents noise occurring as a result of normal backlash of the balls 56. Further, a reference numeral 58 denotes a ball stopper spring for holding the balls 56 in an inoperative state, a reference numeral 59 denotes a twin ball that meshes with a pinion gear 42 in a non-synchronized manner, and a reference numeral 59a denotes a twin ball clip.

The pretension ring 42 is spline-fitted to one end portion of a spindle 61 so as to rotate integrally with the spindle 61, and the groove portion 42a for accommodating the balls 56 of the driving device 51 is formed on an outer peripheral side thereof.

The spindle assembly 12 includes the spindle 61, a tread head 62, which is a lock member for blocking an opening in one end side of the spindle 61, a torque tube 64 disposed in a main body of the spindle 61, first and second torsion bars 65, 66 serving as shaft parts having different twisting torques and together constituting the force limiter mechanism 16, the lock piece 67, which is guided over an outer peripheral surface of the tread head 62, an end piece 69 mounted on the periphery of the spindle 61 from another end side thereof, a spindle ring 70 mounted on a periphery of a tube portion 69a of the end piece 69 to be capable of moving in the axial direction, and rocking elements 68 attached to the end piece 69 to be capable of rotating within a pair of through holes 61a (see FIG. 8) formed in the spindle 61. Note that a reference numeral 71 in FIG. 1 denotes an energy absorbing stopper that limits an amount of relative rotation between the spindle 61 and the tread head 62. Further, 72 is an omega spring and 73 is a safety plate.

A switch housing 81 and a switch piston 82 are disposed on an inner side of the side plate 11a of the retractor frame 11, and a path switching gas generator 83 (MGG: Micro Gas Generator) is attached to the switch housing 81. In this embodiment, the rocking elements 68, end piece 69, spindle ring 70, switch housing 81, switch piston 82, and path switching gas generator 83 together constitute a switching device 20 for switching a force transmission path between the spindle 61 and the tread head 62.

The first torsion bar 65 is formed with a thicker shaft diameter than the second torsion bar 66, and respective end portions 65a, 65b, 66a, 66b of the torsion bars are formed in a Torx (Registered Trademark) shape.

Figure 4:
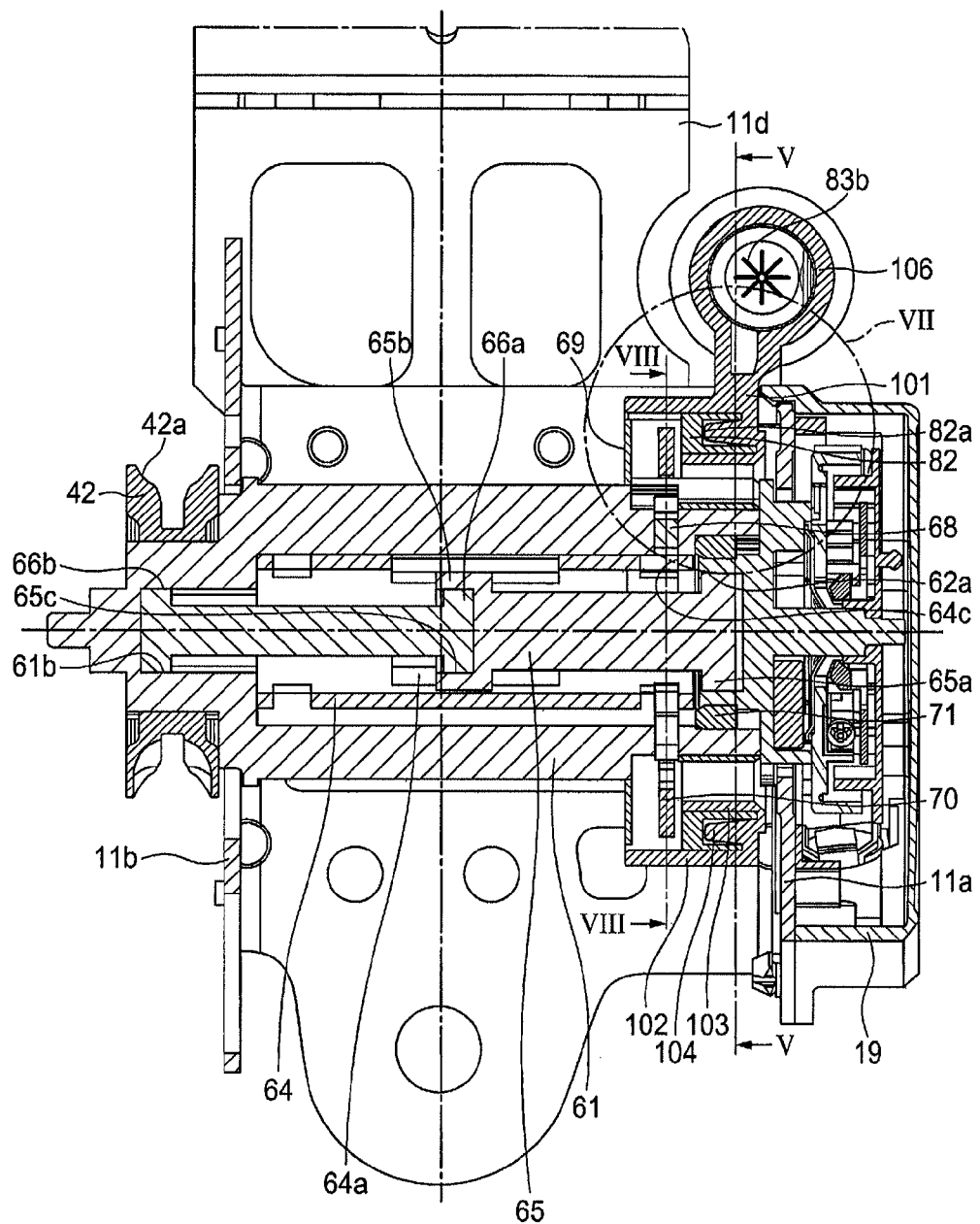
FIG. 4 is a sectional view taken along line IV-IV in FIG. 3, showing the seatbelt retractor except for a part of a retraction spring device and a pretensioner.

As shown in FIG. 4, a Torx-shaped hole portion 62a is formed in an inner peripheral surface of the tread head 62, and one end portion 65a of the first torsion bar 65 is fitted into the hole portion 62a. Further, a Torx-shaped annular groove 64a is provided in an axial direction intermediate portion of an inner peripheral surface of the torque tube 64, and the other end portion 65b of the first torsion bar 65 is fitted into the annular groove 64a. Furthermore, a Torx-shaped hole portion 65c is formed in an inner peripheral surface of the other end portion 65b of the first torsion bar 65, and one end portion 66a of the second torsion bar is fitted into the hole portion 65c. The other end portion 66a of the second torsion bar 66 is fitted fixedly into a Torx-shaped recess portion 61b formed in an inner peripheral surface of another end side of the spindle 61. As a result, the first and second torsion bars 65, 66 are disposed on a force transmission path between the spindle 61 and the pretensioner 15.

Figure 8A:
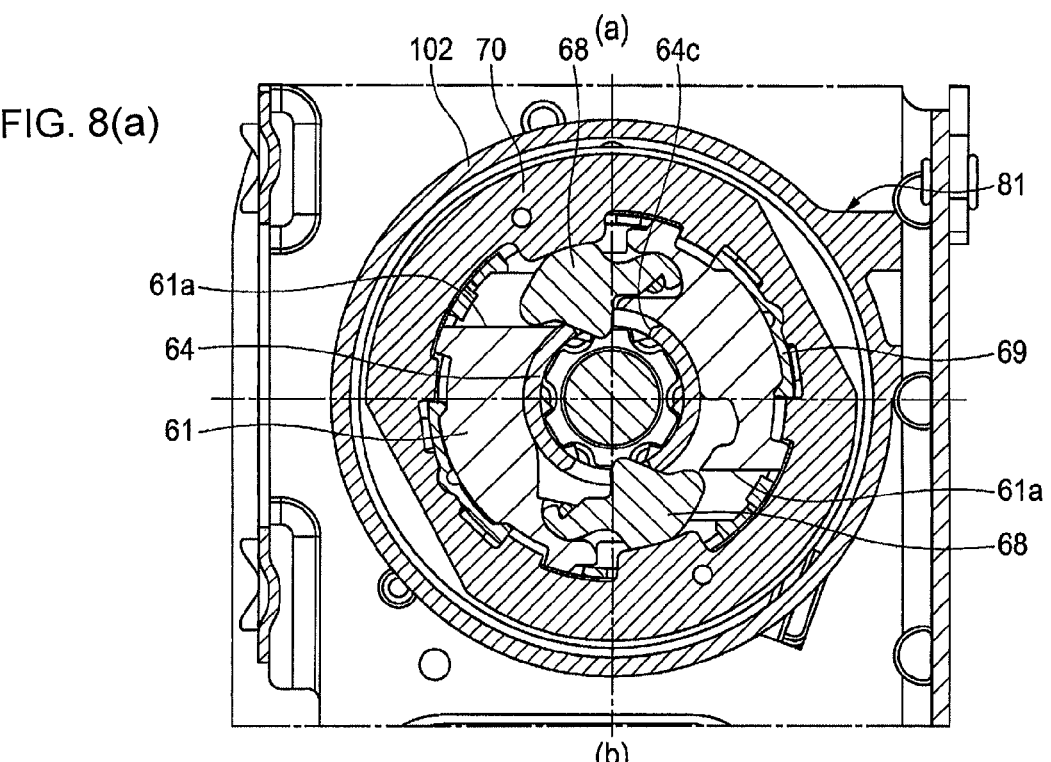
FIG. 8(a) is a sectional view taken along a VIII-VIII line in FIG. 4 prior to activation of a switching device.
Figure 8B:
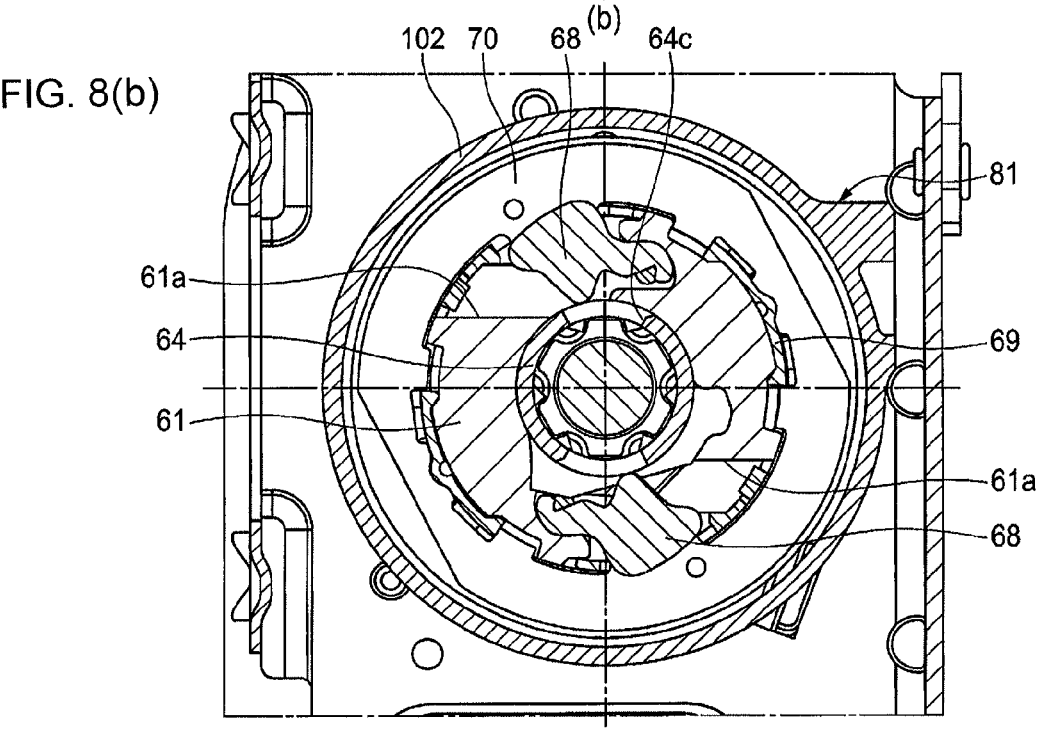
FIG. 8(b) is a sectional view taken along the VIII-VIII line in FIG. 4 following activation of the switching device.
Figure 9:
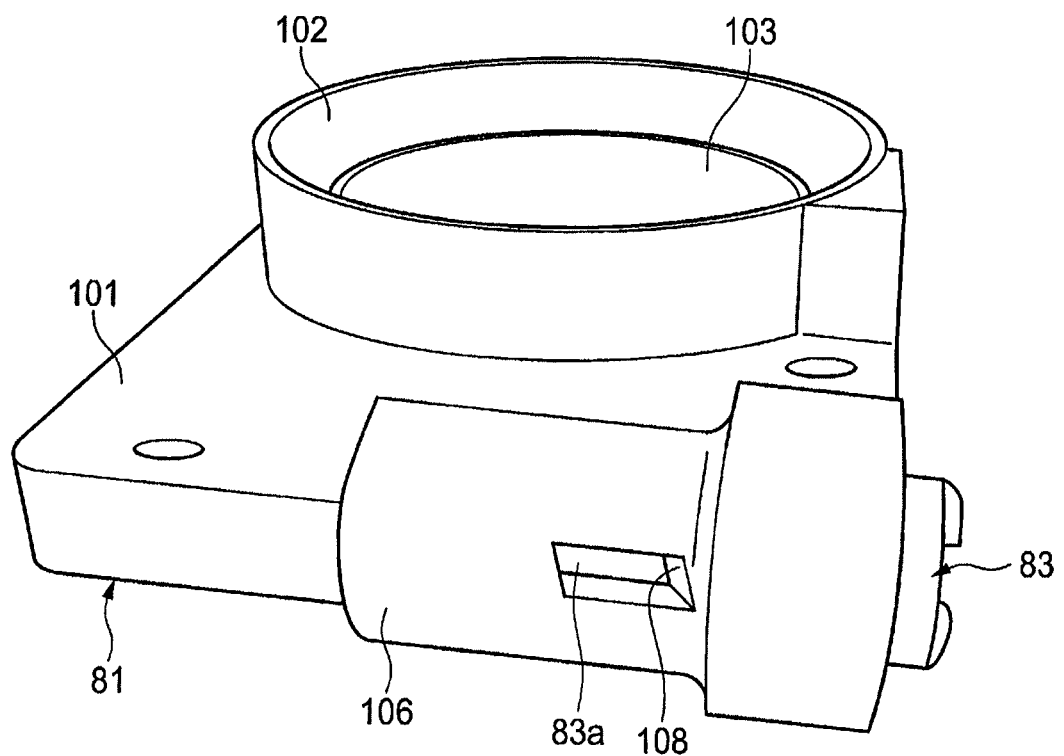
FIG. 9 is a perspective view of a switch housing.

Further, the rocking element 68 disposed in the through hole 61a formed in the spindle 61 rotates so as to advance and retreat within a connecting hole portion 64c formed in an end portion of the torque tube 64. In a state where the rocking element 68 is pressed against an inner peripheral surface of the spindle ring 70, as shown in FIG. 8A, rotation of the rocking element 68 in an advancing direction through the connecting hole portion 64c of the torque tube 64 is suppressed. As a result, the torque tube 64 is joined to the spindle 61 via the pair of rocking elements 68 such that the spindle 61 rotates integrally with the torque tube 64. Further, the end piece 69 is made of resin and used to position the spindle ring 70 relative to the spindle 61.

As shown in FIGS. 4 to 7 and FIG. 9, the switch housing 81 according to this embodiment includes a substantially flat plate-shaped part 101, an outside cylindrical part 102 that extends from one end surface of the substantially flat plate-shaped part 101 to cover an outer peripheral surface of the switch piston 82, and an inside cylindrical part 103 that covers an inner peripheral surface of the switch piston 82 on an inner side of the outside cylindrical part 102, and is attached to the inner side of the side plate 11a of the retractor frame 11. A substantially C-shaped projecting portion 104 that corresponds to the shape of an annular recess portion 82a in the switch piston 82 is provided between the outside cylindrical part 102 and the inside cylindrical part 103. Further, a plurality of engaged portions 104a are formed in an outer peripheral surface of the substantially C-shaped projecting portion 104, and an engagement pawl 82b provided on the switch piston 82 is clicked into the engaged portions 104a.

Further, the switch housing 81 includes a gas generator housing portion 106 for accommodating the path switching gas generator 83, and a gas flow path 107 that communicates with the gas generator housing portion 106 so that gas generated by the gas generator 83 can pass through. The gas generator housing portion 106 is formed in an upper portion of the substantially flat plate-shaped part 101 so as to extend horizontally when the retractor 10 is attached to the vehicle. The gas flow path 107 is formed in the interior of the substantially flat plate-shaped part 101 so as to be oriented diagonally downward, and extends beyond the outside cylindrical part 102 to a cutout portion 104b formed in an identical radial direction position to the substantially C-shaped projecting portion 104 but not including the projecting portion 104.

Figure 10:
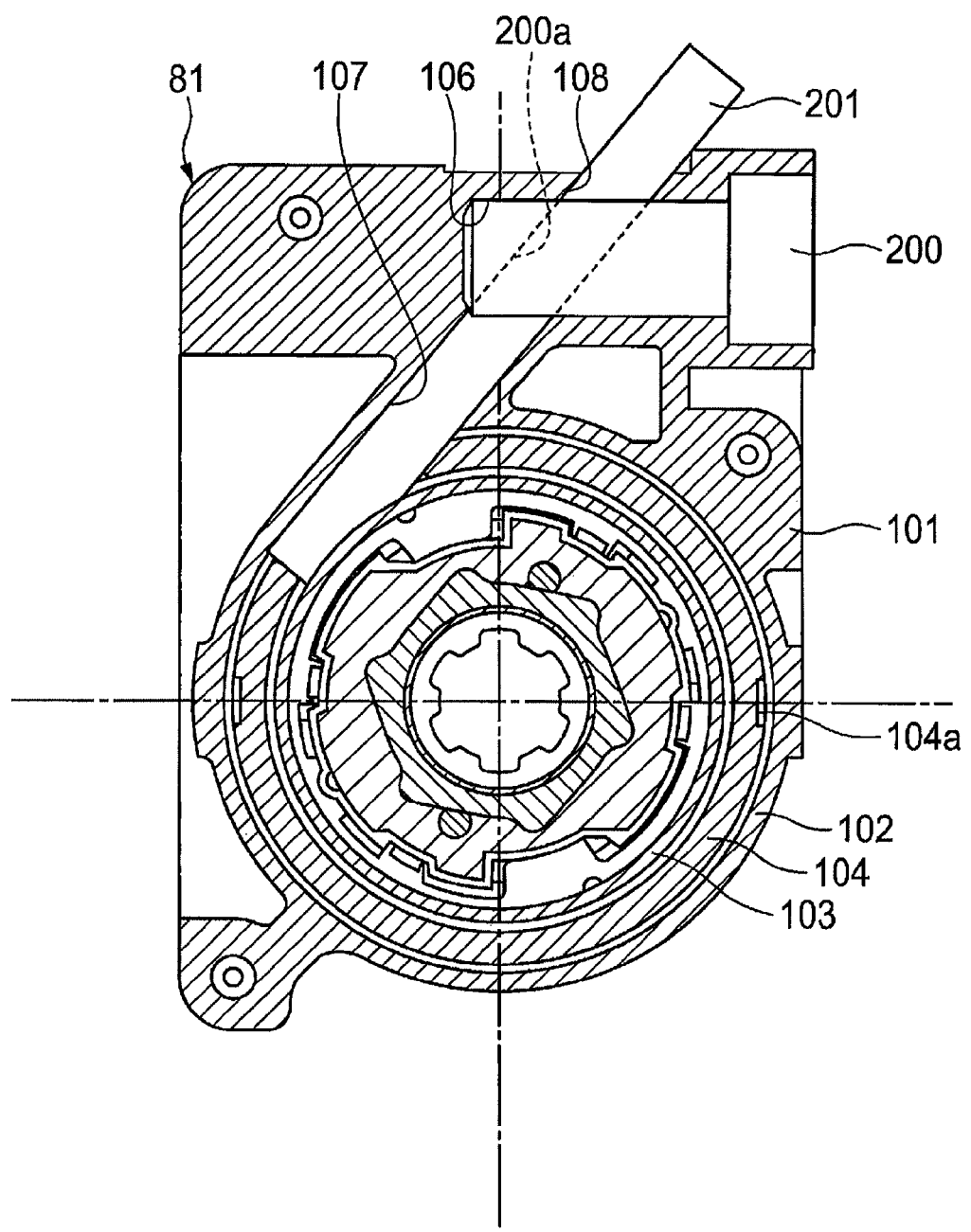
FIG. 10 is a sectional view of the switch housing following die-casting but prior to withdrawal of a sliding piece.

As shown in FIG. 10, the switch housing 81 shaped in this manner is formed by performing die-casting in a state where two sliding pieces 200, 201 for forming the gas generator housing portion 106 and the gas flow path 107 are inserted. After molding the switch housing 81, the two sliding pieces 200, 201 are withdrawn, and as a result, the gas generator housing portion 106 and the gas flow path 107 are formed. Hence, when the sliding piece 201 for forming the gas flow path 107 is withdrawn, a die-cut hole 108 extending in the direction of the gas flow path 107 is formed in the switch housing 81 on an opposite side of the gas flow path 107 to the gas generator housing portion 106. Further, when the sliding piece 200 is withdrawn, an opening portion 106a for inserting the gas generator 83 is formed. Note that the die-casting is performed in a state where the sliding piece 201 for forming the gas flow path 107 is inserted into a hole 200a in the sliding piece 200 for forming the gas generator housing portion 106. Further, the switch housing 81 is formed from zinc die cast, aluminum die cast, or the like.

Figure 5:
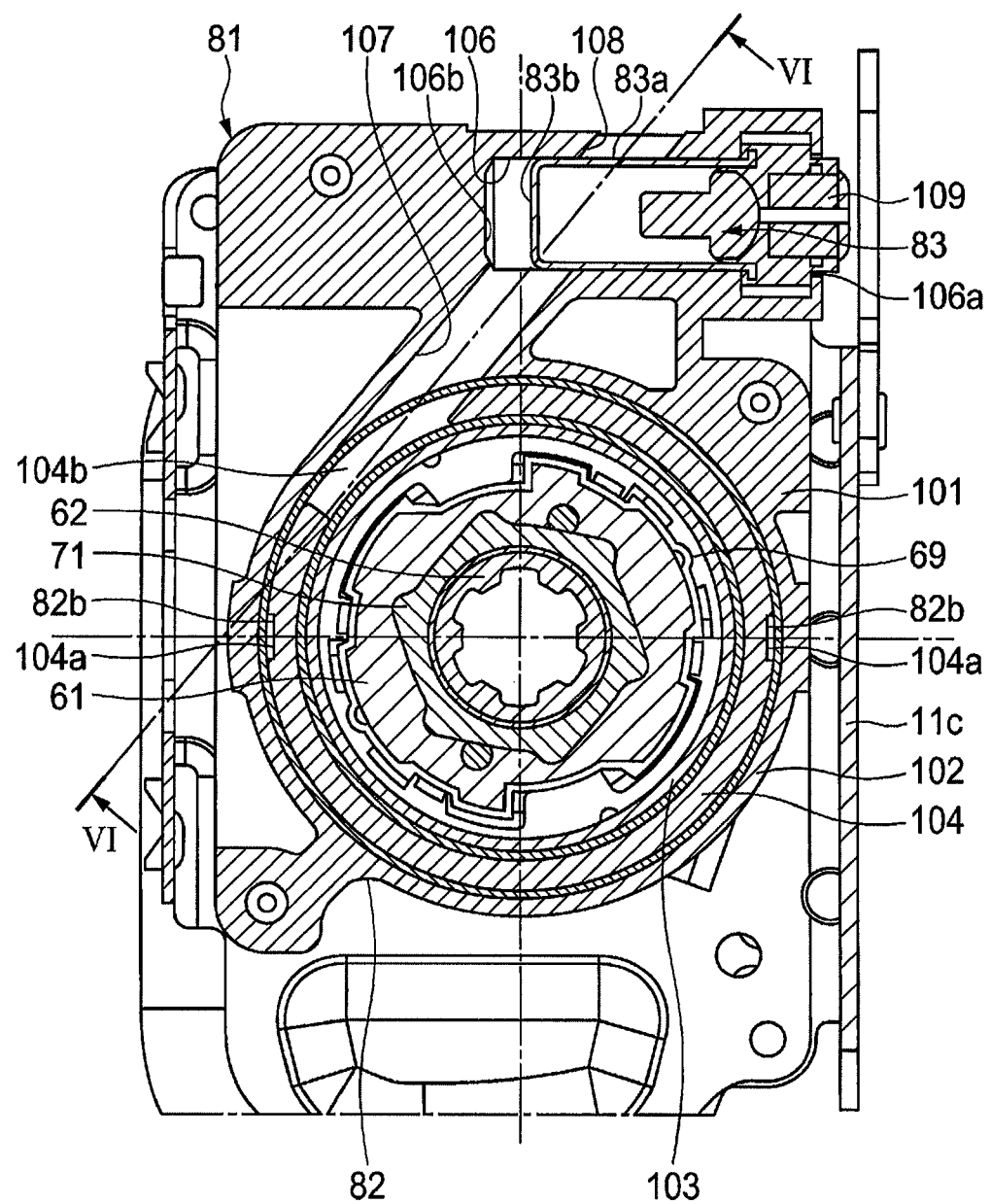
FIG. 5 is a sectional view taken along line V-V in FIG. 4.
Figure 6:
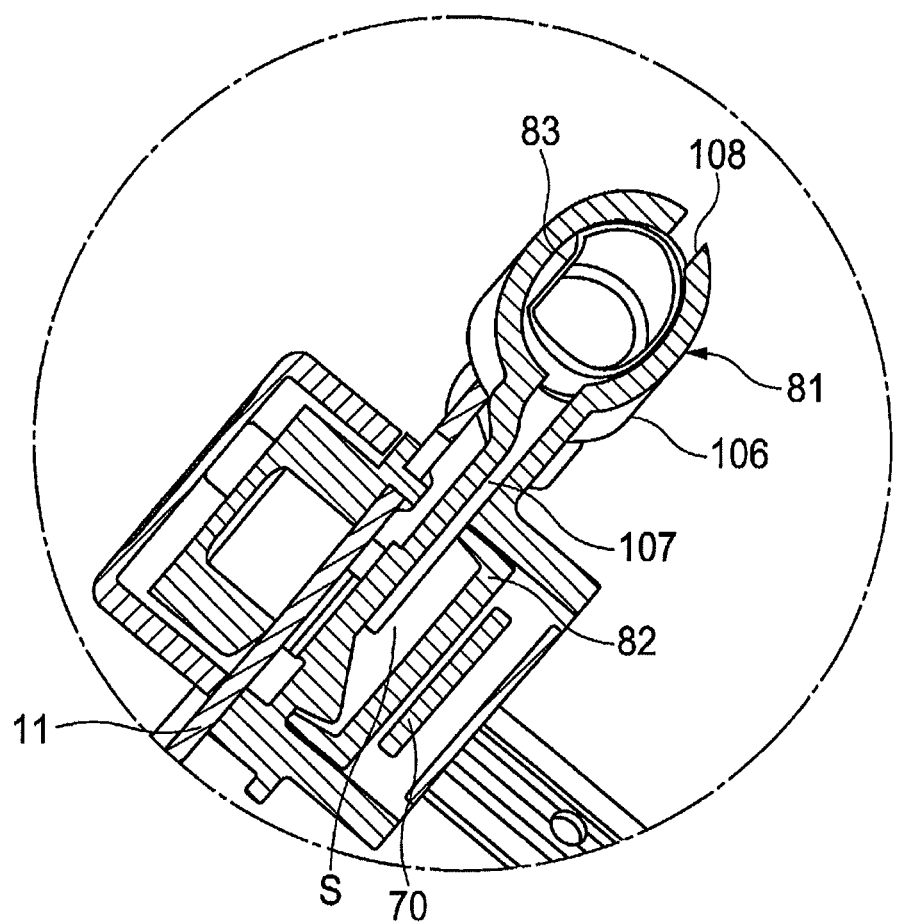
FIG. 6 is a sectional view taken along line VI-VI in FIG. 5.
Figure 7:
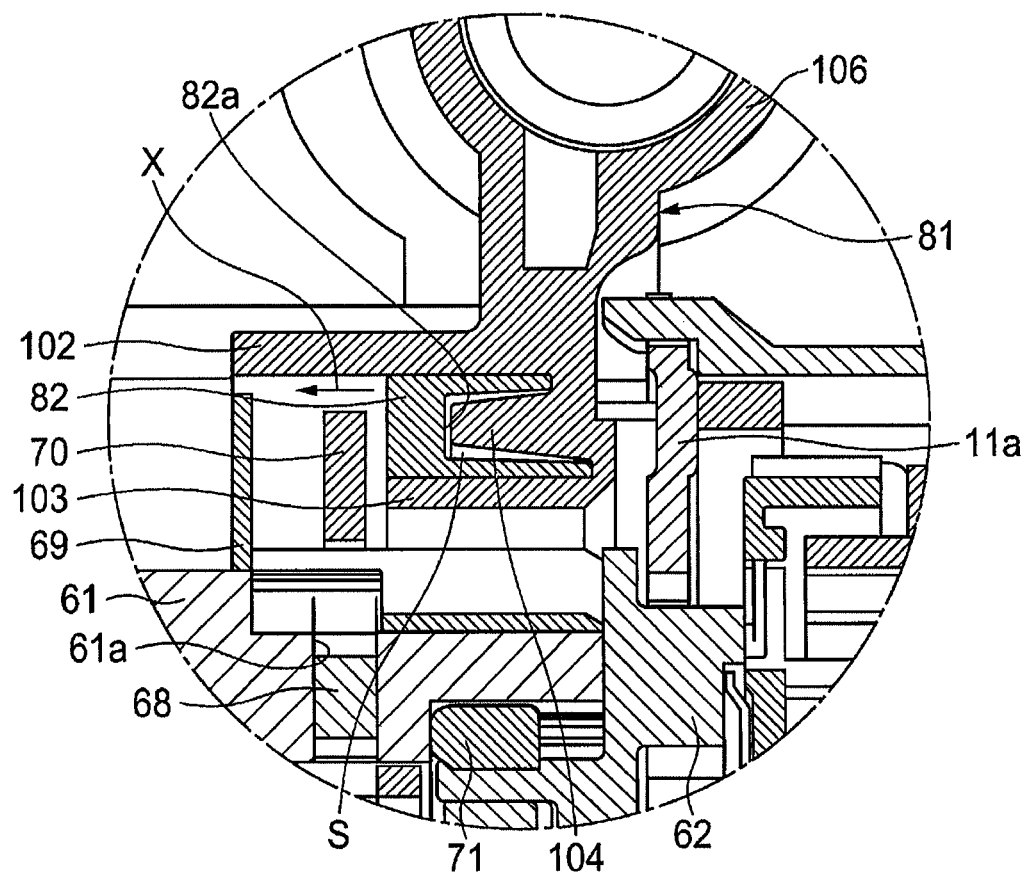
FIG. 7 is a view showing an enlargement of the encircled portion VII of FIG. 4.

As shown in FIG. 5, to prevent gas from escaping when the gas generator 83 is ignited, the die-cut hole 108 is blocked from the gas flow path 107 by a cylindrical closed-end cap 83a of the gas generator 83. In this embodiment, a bottom portion 106b of the gas generator housing portion 106 is formed to project slightly to a position beyond the gas flow path 107 on the opposite side to the opening portion 106a, and by partially inserting a bottom part 83b of the cap 83a up to this projecting part, the cap 83a closes the die-cut hole 108. Further, a slight gap communicating with the gas flow path 107 is formed between the bottom portion 106b of the gas generator housing portion 106 and the bottom part 83b of the cap 83a. Note that the die-cut hole 108 may be sealed completely when the gas generator 83 is attached, or blocked when the gas generator 83 is ignited such that the bottom part 83b of the cap 83a ruptures and the outer peripheral surface of the cap 83a expands.

Further, a gas generator connector 109 is attached to the gas generator 83 accommodated in the gas generator housing portion 106 after the retractor 10 is attached to the vehicle. Note that the gas generator housing portion 106 is disposed above a connecting plate 11c of the retractor frame 11 and below and to the side of a webbing guide hole 11e in an upper stay 11d attached to the connecting plate 11c of the retractor frame 11, and a notch 11g is formed in the upper stay 11d in partial alignment with the shape of the gas generator housing portion 106 so that the upper stay 11d does not interfere with the gas generator housing portion 106. Hence, the gas generator 83 is formed with a compact structure and laid out in an optimum position below the webbing guide hole 11e of the upper stay 11d and between the side plates 11a, 11b of the retractor frame 11 without interfering with the webbing guided by the webbing guide hole 11e.

Accordingly, when the path switching gas generator 83 is ignited such that gas is generated, the gas travels along the gas flow path 107 and spreads through the cutout portion 104b into a space S between the substantially C-shaped projecting portion 104 of the switch housing 81 and the annular recess portion 82a of the switch piston 82. As a result, the engagement between the engagement pawl 82b of the switch piston 82 and the engaged portion 104a of the switch housing 81 is released, enabling the switch piston 82 to move in the axial direction.

Next, operations of the pretensioner 15 and the force limiter mechanism 16 of the seatbelt retractor 10 according to this embodiment will be described.

The pretensioner 15 receives an activation current from the vehicle side, whereby the gas generator 53 of the driving device 51 is ignited such that the balls 56 are moved through the pipe housing 52 by a resulting increase in gas pressure.

The moving balls 56 enter the groove portion 42a in the pretension ring 42 from the pipe housing 52, causing the pretension ring 42 to rotate. A rotary force of the pretension ring 42 is transmitted to the spindle 61 such that the seatbelt fixed to the spindle 61 is retracted. The pretensioner 15 is thereby activated.

Further, when the lock mechanism 14 is activated due to deceleration or rapid unreeling of the webbing W, the tread head 62 is locked to the retractor frame 11 such that rotation of the spindle 61 in the webbing unreeling direction is prevented via the first and second torsion bars 65, 66 attached to the tread head 62, and as a result, the unreeling operation of the webbing W is locked.

When a strong unreeling load of at least a preset value acts on the webbing W due to a reaction of the occupant, the force limiter mechanism 16 is activated, whereby one of the torsion bars 65, 66 provided between the tread head 62 fixed to the retractor frame 11 and the spindle 61 rotated by unreeling of the webbing twists so as to absorb energy, and as a result, an impact exerted on the occupant is mitigated. When the torsion bar 16 twists, the tread head 62 and the spindle 61 rotate relative to each other.

When activation of the force limiter mechanism 16 begins, the rocking elements 68 are pressed against the inner peripheral surface of the spindle ring 70 such that rotation thereof is suppressed, and therefore the torque tube 64 is joined to the spindle 61 via the pair of rocking elements 68. Hence, the force transmission path between the spindle 61 and the tread head 62 passes through the spindle 61, the torque tube 64, the first torsion bar 65, and the tread head 62, in that order.

Further, the first torsion bar 65 is formed with a thicker shaft diameter than the second torsion bar 66 and therefore absorbs energy with a greater twisting torque than the second torsion bar 66.

Meanwhile, in the force limiter mechanism 16, the gas generator 83 is activated at an appropriate timing relating to activation of an airbag in the vehicle, and as a result, the switching device 20 is activated. In the switching device 20, the path switching gas generator 83 is ignited upon reception of a path switching current. A pressure of the gas generated by the path switching gas generator 83 causes the gas to travel along the gas flow path 107 through the switch housing 81, whereby the switch piston 82 is pushed in a direction of an arrow x in FIG. 7, and the spindle ring 70 is likewise shifted in the direction of the arrow x as the switch piston 82 is pushed. Note that radial grooves are formed in the bottom part 83b of the cap 83a of the gas generator 83 so that the bottom part 83b ruptures easily when the gas generator 83 is ignited (see FIG. 4).

When the spindle ring 70 moves in the direction of the arrow x, the rocking element 68 rotates freely within the connecting hole 61a of the spindle 61 in the radial direction of the spindle 61. Accordingly, the rocking element 68 is moved outward from the connecting hole portion 64c of the torque tube 64 (see FIG. 8B) by the connecting hole portion 64c of the torque tube 64, which is formed with a profile for pushing the rocking element 68 outward. As a result, the spindle 61 and the torque tube 64 become capable of relative rotation. Hence, the force transmission path between the tread head 62 and the spindle 61 passes through the spindle 61, the second torsion bar 66, the first torsion bar 65, and the tread head 62, in that order. Note, however, that since the first torsion bar 65 is thicker than the second torsion bar 66, a twisting start load thereof is great, and therefore the first torsion bar 65 simply transmits force without twisting.

When force is applied in the belt unreeling direction to the extent that the belt load reaches the twisting load of the second torsion bar 66, only the second torsion bar 66 having a thin shaft diameter twists while undergoing plastic deformation on the force transmission path, and as a result, the spindle 61 rotates such that the seatbelt is unreeled. Accordingly, energy is absorbed by the first and second torsion bars 65, 66 in two stages. Note that when the spindle 61 and the tread head 62 rotate relative to each other, the energy absorbing stopper 71 moves in the axial direction between the spindle 61 and the tread head 62, and when the energy absorbing stopper 71 has moved by a predetermined amount, the relative rotation is restricted. As a result, the first and second torsion bars 65, 66 are prevented from being wrenched apart.

Hence, with the seatbelt retractor 10 according to this embodiment, the switching device 20 includes the path switching gas generator 83 and the switch housing 81 having the gas generator housing portion 106 accommodating the gas generator 83 and the gas flow path 107 that communicates with the gas generator housing portion 106 so that the gas generated by the gas generator 83 can pass through, wherein the gas generator housing portion 106 and the gas flow path 107 are formed in the switch housing 81 in a curved shape, and the die-cut hole 108 extending in the direction of the gas flow path 107 on the opposite side of the gas flow path 107 to the gas generator housing portion 106 is blocked from the gas flow path 107 by the gas generator 83. Thus, the gas generator 83 for the switching device can be laid out in an optimum position, and the die-cut hole 108 formed in the switch housing 81 when the gas flow path 107 and the gas generator housing portion 106 are formed in a curved shape can be closed efficiently during ignition of the gas generator 83 without providing a separate lid or the like.

Further, the gas generator housing portion 106 extends horizontally when the retractor 10 is attached to the vehicle, and therefore water and the like can be prevented from infiltrating the gas generator housing portion 106.

The switch housing 81 is attached to the inner side of the side plate 11a of the retractor frame 11, and therefore a movement region of the switching piston 82 is also located on the inner side of the side plate 11a. The retractor 10 can therefore be formed with a compact structure.

Furthermore, when the retractor 10 is attached to the vehicle, the gas generator housing portion 106 is disposed in the upper portion of the switch housing 81 in a position that prevents interference with the webbing guided by the webbing guide hole 11e of the retractor frame 11, and a cutout is formed in the retractor frame 11 in a position opposing the opening portion 106a in the gas generator housing portion 106. Therefore, the connector 109 can be attached to the gas generator 83 easily while maintaining a compact structure.

In this embodiment, the upper stay 11d is attached to the connecting portion 11c of the retractor frame 11 and the webbing guide hole 11e is provided in the upper stay 11d. However, the upper stay 11d may be omitted and the webbing guide hole 11e may be provided in a part formed by extending the retractor frame 11 upward. In this case, a cutout may be formed in the upwardly extending part of the retractor frame 11 in a position opposing the opening portion 106a in the gas generator housing portion 106.

Further, the gas flow path does not necessarily have to be formed by withdrawing a sliding piece of a die. For example, the gas flow path may be formed during post-processing by opening a hole in a part corresponding to the sliding piece using a drill or the like. Hence, the hole extending in the direction of the gas flow path 107 on the opposite side of the gas flow path 107 to the gas generator housing portion 106 is not limited to the die-cut hole 108 according to this embodiment.

Note that the present invention is not limited to the embodiment described above and may be subjected to appropriate amendments, modifications, and so on.

For example, the switching device according to this embodiment is applied to a case in which the first and second torsion bars are used as energy absorbing mechanisms, but in the case of a seatbelt retractor in which the pretensioner is joined to the spindle via a torsion bar, the first torsion bar having the thick shaft diameter may be used as a force transmission path while the pretensioner is activated, and the second torsion bar having a thin shaft diameter may be used as an energy absorbing mechanism.

The present application is based on Japanese Patent Application No. 2009-101071, filed on Apr. 17, 2009, the contents of which are incorporated herein by reference.

We claim:

1. A seatbelt retractor comprising:
a refractor frame;
a spindle supported by the retractor frame and being freely rotatable;
a lock member that is supported by the retractor frame and configured to become fixed to the retractor frame when acceleration exceeds a predetermined value;
a torsion bar that is disposed on a force transmission path between the spindle and the lock member and includes a plurality of shaft parts having different twisting torques; and
a switching device for switching the plurality of shaft parts of the torsion bar forming the force transmission path,
wherein the switching device includes a switch piston, a gas generator, and a switch housing having a gas generator housing portion defining a bore in which the gas generator is received, the switch housing having a gas flow passageway that communicates with the bore so that gas generated by the gas generator passes through the gas flow passageway to the piston,
the gas flow passageway being located between the bore and the piston and being formed in the switch housing diagonally with respect to central axis through the bore, and
a hole defined in the switch housing on an sidewall of the bore that is opposite from the gas flow passageway, the gas generator being positioned in the bore between the hole and the gas flow passageway and blocking the hole so as to prevent gas generated by the gas generator from flowing out of the hole.

2. The seatbelt retractor according to claim 1, wherein the bore extends horizontally when the retractor is attached to a vehicle.

3. The seatbelt retractor according to claim 2, wherein the switch housing is attached to an inner side of a side plate of the retractor frame.

4. The seatbelt retractor according to claim 3, wherein the bore is disposed in an upper portion of the switch housing.

5. The seatbelt retractor according to claim 4, wherein the hole is coaxial with the gas flow passageway.

6. The seatbelt retractor according to claim 2, wherein the hole is coaxial with the gas flow passageway.

7. The seatbelt retractor according to claim 3, wherein the hole is coaxial with the gas flow passageway.

8. The seatbelt retractor according to claim 1, wherein the hole is coaxial with the gas flow passageway.

9. The seatbelt retractor according to claim 1, wherein the switch housing is attached to an inner side of a side plate of the retractor frame.

10. The seatbelt retractor according to claim 9, wherein when the refractor is attached to a vehicle and the bore is disposed in an upper portion of the switch housing.

11. The seatbelt retractor according to claim 1, wherein the piston is moveable along an axis defined by the torsion bar.

12. The seatbelt retractor according to claim 1, wherein the piston is coaxial with the torsion bar.

13. The seatbelt retractor according to claim 12, wherein the hole and the passageway have a cross-sectional shape that is the same.

14. The seatbelt retractor according to claim 1, wherein the hole and the passageway have a cross-sectional shape that is the same.

* * * * *